J. L. NILSON & J. PRINCE.
AUTOMOBILE TANK FILLER.
APPLICATION FILED JULY 2, 1915.
1,212,384.
Patented Jan. 16, 1917.
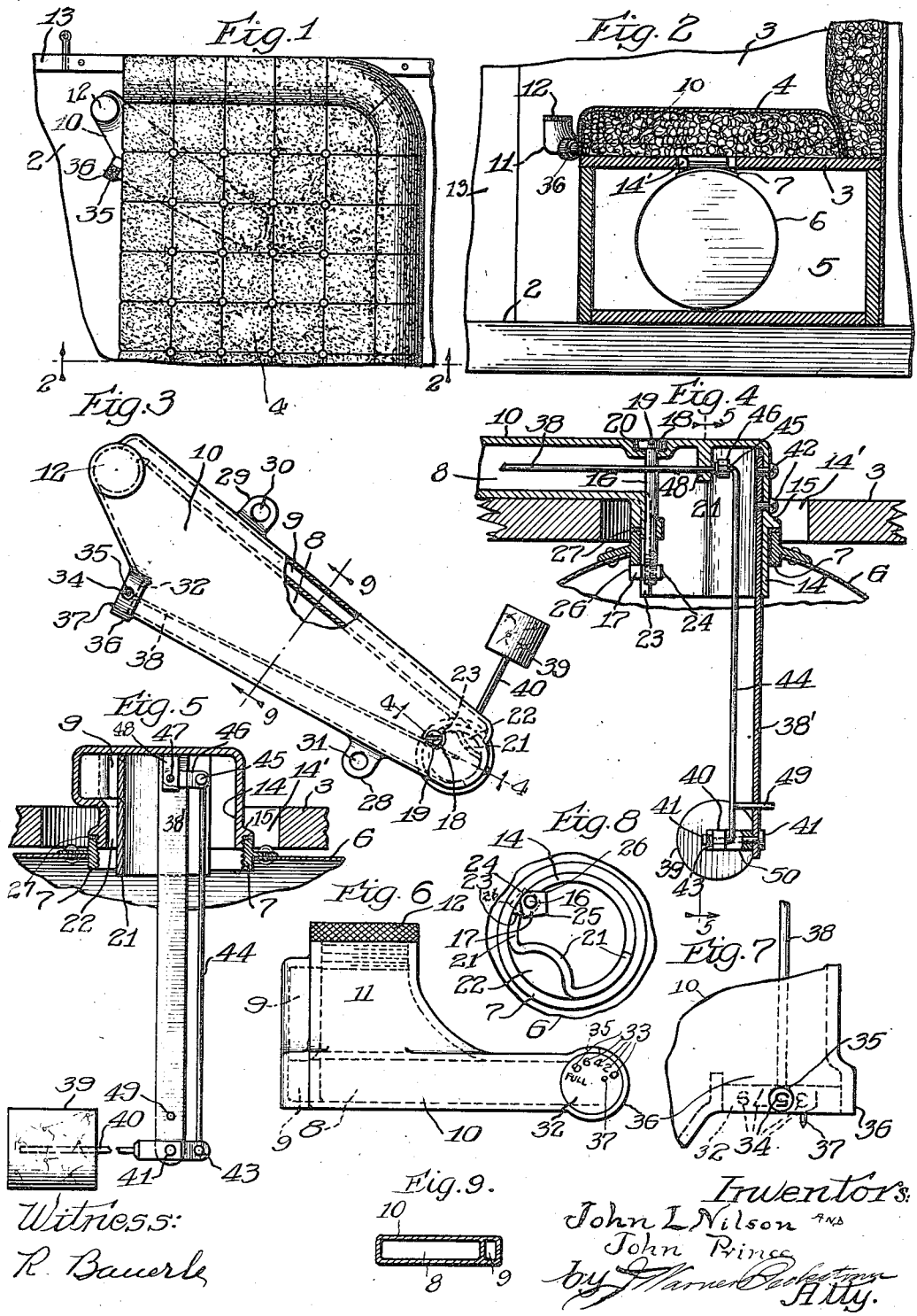
Witness:
R. Bauerle
Inventors:
John L. Nilson and
John Prince
by ———— Atty.

UNITED STATES PATENT OFFICE.

JOHN L. NILSON AND JOHN PRINCE, OF CHICAGO, ILLINOIS.

AUTOMOBILE-TANK FILLER.

1,212,384.  Specification of Letters Patent.  Patented Jan. 16, 1917.

Application filed July 2, 1915. Serial No. 37,667.

*To all whom it may concern:*

Be it known that we, JOHN L. NILSON and JOHN PRINCE, citizens of the United States, residing at Chicago, Cook county, Illinois, have invented a new and useful Automobile-Tank Filler, of which the following is a specification.

Our invention relates to a device for conveniently filling a gasolene tank of that type of self propelling vehicles which has the tank arranged under the driver's seat in order to effect economy of space and cost of construction.

The object of the present invention is to relieve this arrangement of its demonstrated inconveniences, and to provide a comparatively inexpensive and convenient filling device having its capped inlet at all times exposed and conveniently accessible.

Another object of the invention is to provide a gage or indicator disclosing to the senses of sight and touch the quantity of liquid fuel in the tank, so that the driver may without leaving his seat know the condition of his fuel supply.

With these general objects in view our invention consists in the novel tank filler, its form of construction, combination, and arrangement, all as hereinafter described in detail, illustrated in the accompanying drawing, and incorporated in the appended claims.

In the drawing Figure 1 is a top plan view of a section of cushioned automobile seat and vehicle body with our invention applied thereto. Fig. 2 is a section taken substantially on line 2—2 of Fig. 1. Fig. 3 is an enlarged plan view, partly broken away, of the filler alone. Fig. 4 is an enlarged section taken substantially on line 4—4 of Fig. 3. Fig. 5 is a section taken on line 5—5 of Fig. 4. Fig. 6 is an enlarged front, or exposed, end view of the filler. Fig. 7 is a broken away and enlarged detail view of parts shown in Figs. 1, 3 and 6. Fig. 8 is an elevated bottom plan view of a portion of the details shown in Fig. 4. Fig. 9 is a section taken on the line 9—9 Fig. 3.

In the several views, 2 represents a portion of the tonneau within which the usual seat —3— provided with a cushion 4 is placed. Under the seat is a space 5 in which the fuel tank —6— is placed. This tank is the usual or conventional form with a rim 7 which usually has threaded engagement with a closer cap which in the present instance has, substantially, been moved from its covered to an accessible position at a corner of the driver's seat.

The filler as a whole is designated with the numeral 10 and is preferably a hollow casting of flattened form adapted to lie under the cushion 4. Within the body 10 is a space 8 which serves as a conduit for conducting liquid into the tank 6, and a narrow conduit 9 through which air in the tank, replaced by inflowing oil, is permitted to escape. On the inlet end of the filler, shown on a large scale in Fig. 6, is formed a vertical conduit-portion 11 which is provided with the cap removed from the rim 7, which cap —12— has a threaded portion engaging suitable threads in the portion 11, the details of which are immaterial so long as they perform the usual functions of an inlet.

As shown in Figs. 1 and 2 the cushion covers the major portion of the filler, or substantially all of the filler except the capped inlet and the indicator to be hereinafter referred to. As Fig. 2 shows the flat portion of the projecting part is so far below the upper surface of the usual cushion thickness that the leg of a driver in his usual position need not contact therewith and the upstanding portion 11 is at the extreme side of the seat where there is usually ample space for the receiving end of the filler, adjacent to the door —13. The rear end of the filler is in the form of a downwardly projecting cylindrical portion 14 which is inserted in the opening vacated by the cap 12 or its equivalent, said opening being opposite an opening 14′ formed in the board bottom 3 of the seat. The insert, or outlet, end 14 is provided with a flange 15 which rests upon the upper edge of the rim 7 and is clamped fast to said rim by means of a bolt 16 which has a nut 17 which is engaged with or disengaged from the lower edge of the rim 7, the engaged and disengaged positions of the nut and its peculiar formation, being shown in, respectively, Figs. 4 and 8. In the head —18— of the bolt is a screw driver slot 19 so that the bolt may be turned in and caused to turn the nut by means of an ordinary screw driver. The body 10 of the filler is provided on its upper side with a depression 20 in which the head of the bolt is sunk below the upper surface of the filler, or flush therewith, so as to obviate the bolt head catching in the cushion 4. In the outlet end 14 the air passage 9 is continued to the lower end of said insert portion 14 by means of a partition 21 which provides a space 22 which communicates with the air passage 9 while the remaining space within the portion 14 communicates with the space 8. In Fig. 3 this division of space is indicated by dotted lines.

In the form of partition wall 21 shown one of its vertical edges, designated separately as 23, is utilized as a stop limiting the rotation of the nut 17 when the bolt 16 is turned. The form of wall 21 shown as in Fig. 8 may be modified in any suitable way that will provide the space 22, and its stop portion 23 herein shown may be replaced by any suitable lug or projection the equivalent of the part 23 in function. The nut 17 is shown as an ordinary square nut with one of its corners cut off and rounded as a curved surface 24 which when rotated opposite the rim 7 as in Fig. 8 will clear said rim. The curved portion 24 is also designed to pass the edge or stop 23, while, as indicated by dotted lines in Fig. 8 a corner —26— will not pass the stop 23. As shown in full lines in Fig. 4 and in dotted lines in Fig. 8 a straight-edge portion of the nut is engaged with the lower edge of the rim 7. The threading of the nut and bolt is arranged to cause the nut to rise on the threads of the bolt when the bolt is turned and the stop 23 prevents rotation of the nut. Reversing the rotation of the bolt the nut will turn with the bolt as soon as the frictional grip of the nut has been released from the rim or flange 7, to substitute the cut away portion for the engaging portion of the nut as to position relative to the rim 7. This is a simple and comparatively inexpensive manner of fastening the filler in the tank opening, but the details thereof are not essential as a part of the invention in its entirety, other expedients being available for this particular purpose. It is deemed important with reference to the cost of construction. Between the flange 15 and rim or flange 7 is shown interposed a fiber ring 27 to make the joint liquid tight.

The body 10 of the filler is provided with ears 28 and 29 having screw holes 30 and 31 therethrough which may be engaged by screws fastening the filler to the seat 3.

The means for indicating to touch and sight the quantity of liquid in the tank 6 is represented by a disk 32 and the means for actuating it by a float. The disk 32 has characters or numbers 33 arranged in an arc on its face and similar characters or numbers 34 on its periphery, the latter being successively observable through a hole or sight opening 35 in a casing portion 36 formed as a part of the body 10. In addition to its readable characters named the disk 32 is provided on its face with a short spur 37 the position of which on its arc of rotation may be felt by the operator's finger when it is too dark to see the visual indicators. The disk 32 is mounted on an axial rod 38 which is rotated by the rise or fall of a float 39 on an arm or lever 40 fulcrumed at 41 to the lower end of a depending bearing bar 38' which is secured by screws 42 to an inner wall of the part 14. The load end of the lever 40 has pivoted thereto at 43 the lower end of a connecting bar 44. The upper end of the latter is pivoted at 45 to a crank arm 46 which connects rigidly at 47 with the rear end of the rod 38, said rear end being journaled in a lug 48 on the interior of the body 10. A stop 49 is mounted on the bar 38' and arranged to engage the arm 40 before it reaches a vertical position, or near enough to such position to bring the center of gravity of the float 39 near enough in line with the pivots 41 and 43 to prevent its downward movement.

Having thus described our invention, we claim as new and desire to secure by Letters Patent—

1. A fuel tank filler constructed and arranged for emplacement under a vehicle seat cushion and provided with a liquid fuel conduit and an air-conduit both adjustable in communication with the interior of said tank and having their inlet and outlet end, respectively, uncovered at the edge of said cushion.

2. The combination with a fuel tank arranged under a driver's seat having a cushion thereon, of a conduit communicating with the inlet opening to said tank and arranged between said seat and cushion, said conduit having its inlet arranged in an exposed position.

3. The combination with a fuel tank arranged under a driver's seat covered by a seat cushion, of a filler conduit covered by said cushion and extending the inlet opening of said tank to an exposed or uncovered position.

4. The combination with a fuel tank of a self propelling vehicle having said tank underneath the driver's seat, of a fluid conducting and indicating device arranged between the seat and the cushion thereon by means of which the driver from his seat is enabled to refill said tank and note the quantity of liquid in said tank.

5. The combination with the seat and seat cushion of a self propelling vehicle, and a fuel tank covered by said seat and seat cushion, of a filler having an indicator thereon and an air passage therein communicating with the interior of said tank and permitting air to be expelled therefrom, said filler being covered by said cushion with the exception of its inlet and indicator, and means for operating said indicator by the liquid in said tank.

In testimony whereof we have hereunto signed our names.

JOHN L. NILSON.
JOHN PRINCE.